US006475559B1

(12) United States Patent
Bettinger

(10) Patent No.: US 6,475,559 B1
(45) Date of Patent: Nov. 5, 2002

(54) ACTIVE VEHICLE COATING

(76) Inventor: David S. Bettinger, 8030 Coventry, Grosse Ile, MI (US) 48138-1119

( * ) Notice: Subject to any disclaimer, the term of this patent is extended or adjusted under 35 U.S.C. 154(b) by 0 days.

(21) Appl. No.: 09/251,869

(22) Filed: Feb. 17, 1999

(51) Int. Cl.$^7$ .............................. B05D 5/10; B32B 7/12
(52) U.S. Cl. ................................. 427/208.2; 428/349
(58) Field of Search ..................... 428/343, 349; 427/208.2

(56) References Cited

U.S. PATENT DOCUMENTS

| 4,496,628 A | * | 1/1985 | Deatcher et al. ............ 428/343 |
| 4,596,673 A | | 6/1986 | Beale ........................ 252/586 |
| 4,913,760 A | | 4/1990 | Benson et al. ............ 156/244.1 |
| 4,917,643 A | | 4/1990 | Hippely et al. .............. 446/14 |
| 5,030,513 A | | 7/1991 | Hartman ..................... 428/363 |
| 5,030,514 A | | 7/1991 | Hartman ..................... 428/363 |
| 5,034,077 A | | 7/1991 | Pata et al. .................... 156/84 |
| 5,188,260 A | * | 2/1993 | Bettinger ..................... 222/95 |
| 5,242,751 A | | 9/1993 | Hartman ..................... 428/324 |
| 5,252,155 A | | 10/1993 | Nowicki et al. .............. 156/84 |
| 5,256,351 A | * | 10/1993 | Lustig et al. ................. 264/22 |
| 5,368,588 A | * | 11/1994 | Bettinger .................... 604/131 |
| 5,387,304 A | | 2/1995 | Berner et al. ............... 156/212 |
| 5,538,576 A | | 7/1996 | Knop et al. .................. 156/229 |
| 5,643,676 A | | 7/1997 | Dobashi et al. ............ 428/411.1 |
| 5,733,976 A | | 3/1998 | Sailer ......................... 525/100 |

* cited by examiner

Primary Examiner—Wayne A. Langel

(57) ABSTRACT

A conformable coating, comprising a heat-shrink polymeric matrix sheet embedded with and enveloping active and constant tonal and coloring material and coated with an adhesive layer, is used for the permanent retrofit to the surface of a vehicle for functional and decorative coloration. The method of utilization comprises the steps of applying the matrix sheet, followed by thermally conforming the matrix sheet to the vehicle, and finally thermally activating the adhesive to achieve permanent coating attachment.

9 Claims, 1 Drawing Sheet

ACTIVE VEHICLE COATING

BACKGROUND OF THE INVENTION a) Field of the Invention

The present invention relates to material and methods of using a stock material structurally defined sheet, with a continuous and non-uniform surface embedded with and enveloping active utilitarian tonal and coloring material which conforms to the contour of a non-planar surface. More particularly, the present invention relates to a thermo-mechanically-worked polymeric matrix sheet embedded with active tonal and coloring utilitarian material and transfer coated with adhesive for the permanent retrofitting attachment onto vehicles for both decorative and functional purposes.

b) Description of the Prior Art

It would be advantageous from both a decorative and functional standpoint for vehicles to be afforded a facile method and means for changing color. For example, a black colored automobile parked out in the hot summer sun with the ability to reversibly change its color to white would be better able to reflect the sun's rays and thus remain cooler compared to the automobile with a constant black color.

An active tonal and coloring material, for purposes of this invention, is defined as a material whose tonal and coloring qualities reversibly and irreversibly change due to electrical stimulus, temperature change, light change, and various combinations of the aforementioned stimuli.

The prior art on vehicle coating teaches about polymeric films with pigment. Dobashi, et. al., U.S. Pat. No. 5,643,676, disclose a coating of a colored polyolefin film and a pressure sensitive adhesive layer. This non-shrink constant color film is but a temporary coating for protection during vehicle transit.

The prior art on vehicle coating teaches about thermally deformable and thermoforming polymeric films with paint/pigment. Hartman, U.S. Pat. Nos. 5,030,513, 5,030,514, and 5,242,751, discloses paint composite articles comprising thermally and vacuum deformable carrier films having an adhesive layer on one surface and a paint layer on the other surface. Knop, et. al., U.S. Pat. No. 5,538,576, disclose a paint carrier film with an adhesion enhancer applied during original equipment manufacturing of the vehicle body part. Berner, et. al., U.S. Pat. No. 5,387,304, disclose a carrier film, coated on one side with paint and on the other with an adhesive, applied by thermo-forming to the automotive body part. Pata, U.S. Pat. No. 5,034,077, and Benson, et. al., U.S. Pat. No. 4,913,760, disclose paint-coated polymeric films which are applied by vacuum thermoforming the films to the vehicle body part. The problem with Hartman, Knop, Berner, Pata, and Benson is that the constant color polymeric film must be applied to the vehicle body part using molds and under vacuum at the factory.

In the prior art of effect painting for toys Hippely, et. al., U.S. Pat. No. 4,917,643 disclose a toy vehicle coated with spray paint containing thermochromic material. In the prior art of effect painting for motor vehicle bodies Sailer, U.S. Pat. No. 5,733,976 discloses an effect paint comprising liquid crystal polymer compounds. The problem with using paint is that it is too thin to contain an effective quantity of thermochromic material, or it must be applied in numerous costly layers.

In the prior art of coating glass Beale, U.S. Pat. No. 4,596,673 discloses glass coated with photochromic material used in the manufacture of glass for automobile windows and windshields. Beale applies exclusively to window applications, not to vehicle surface coating.

SUMMARY OF THE INVENTION

In order to overcome the above-mentioned deficiency and problem in the prior art, this invention teaches the construction and installation method of a conformable coating, comprising a heat shrink polymeric substantially transparent matrix sheet embedded with and enveloping active tonal and coloring material and coated with an adhesive layer, used for the retrofitting permanent attachment to the surface of a vehicle. This conformable coating is installed by means of shrinking this matrix sheet onto the vehicle.

1. Objects of the Invention

A general object of this invention is to provide a means for vehicles to achieve a variety of active tonal and color changes for the functional purpose of vehicle temperature control.

Another general object of this invention is to provide a means for vehicles to achieve a variety of active tonal and color changes for decorative reasons.

An additional object of this invention is to provide a means for vehicles to achieve a variety of active tonal and color changes for the functional purpose of vehicle camouflage and concealment.

A still additional object of this invention is to provide an active conformable coating for vehicles which can also function as a permanent (rust) protective coating for the vehicle.

A still additional object of-this invention is to provide an active conformable coating for vehicles which is signal responsive to serve the functional purpose of remote visual vehicle identification and location.

A still additional object of this invention is to provide an active conformable coating for vehicles which is sensor responsive to serve the functional purpose of a vehicle hazard and warning visual signal (low battery).

A still additional object of this invention is to disclose methods in order to economically produce a prefabricated, pre-wired, optically active low signature coating for vehicles.

2. Features of the Invention

In keeping with these objects and others which will become apparent hereinafter, one feature of the present invention resides, briefly stated, in the ease of retrofitting permanent attachment of the coating to the vehicle surface.

An additional feature of the present invention is the ease afforded for readily changing vehicular tone and color by changing electrical, temperature, and light stimuli as well as various combinations of the aforementioned stimuli.

The composition of the conformable coating comprises:
 a) a heat shrink polymeric substantially nonopaque matrix sheet having first and second major surfaces;
 b) wherein said polymeric matrix sheet is embedded with and envelopes active tonal and coloring material within said polymer matrix;
 c) wherein said first surface of said polymeric matrix sheet possesses a transfer coated permanent adhesive layer.

In the prior art of packaging, Nowicki, et. al., U.S. Pat. No. 5,252,155, disclose a heat-shrink film coated with adhesive for applying to beverage containers. Nowicki is an original equipment manufacturing (OEM) process for small scale surfaces. The preferred embodiment of the present invention is as a coating of vehicle body parts ranging in size from 2–3 square feet up to 1000 square feet. The vehicle substrate is an automobile, ground vehicle, marine vessel, and aerospace body part.

A facile means of retrofitting the conformable coating onto a vehicle substrate comprises the steps of:

a) applying said polymeric matrix sheet on its first surface to said vehicle substrate body part;

b) subjecting said polymeric matrix sheet to heat to shrink said sheet so as to conform to said vehicle substrate body part; and c) effecting the activation and curing of said adhesive with heat so as to affix it permanently thereto. Drawing Description:

BRIEF DESCRIPTION OF THE DRAWINGS

The present invention is further described with reference to the accompanying drawings in which.

DETAILED DESCRIPTION

Figure 1:
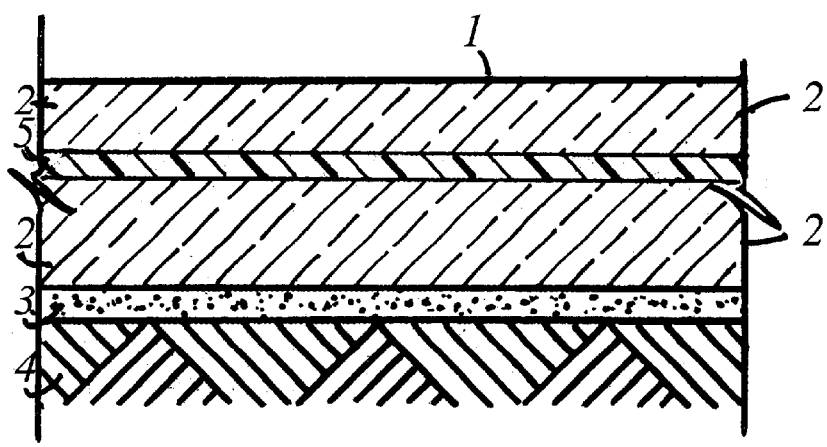
FIG. 1 is a vertical cross sectional view, in fragment, showing the preferred embodiment of the conformable coating as a coating containing thermochromic tonal and coloring material.

FIG. 1. shows a conformable coating (1) comprising:

a) a heat shrink polymeric substantially transparent matrix sheet (2) having first and second major surfaces;

b) wherein said polymeric matrix sheet (2) is embedded with and envelopes a layer of Chromatic Technologies DYNACOLOR™ thermo-chromic ink (5) within said polymer matrix sheet (2);

c) wherein the first surface of said of said polymeric matrix sheet (2) possesses a transfer coated permanent adhesive layer (3).

The vehicle substrate (4) is an automobile, ground vehicle, marine vessel, and aerospace body part. The polymeric matrix sheet (2), which is a thermo-mechanically worked matrix sheet, possesses a layer thickness within the range of 0.15 to 2.0 mm. This transfer coated adhesive layer (3) possesses a thickness within the range of 0.1 to 0.8 mils.

Figure 2:
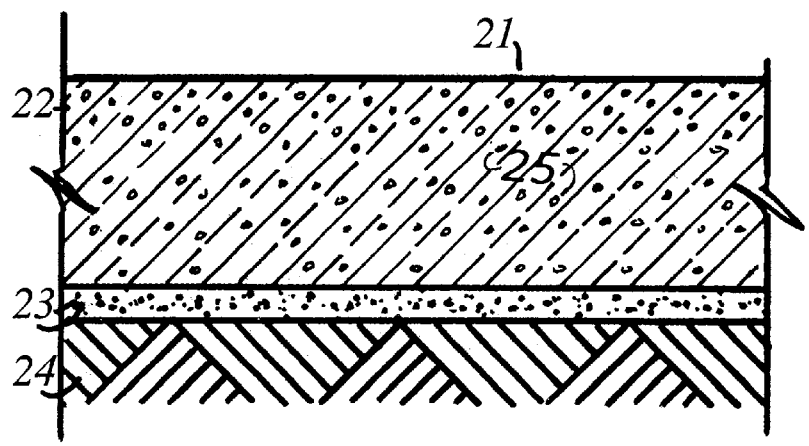
FIG. 2 is a vertical cross sectional view, in fragment, showing another embodiment of the conformable coating as a coating containing photochromic tonal and coloring material.

FIG. 2. shows a conformable coating (21) comprising:

a) a heat shrink polymeric substantially transparent matrix sheet (22) having first and second major surfaces;

b) wherein said polymeric matrix sheet (22) is embedded with and envelopes dispersed PPG PhotoSol$^R$ Photochromic dye crystals (25) within said polymer matrix sheet (22);

c) wherein the first surface of said of said polymeric matrix sheet (22) possesses a transfer coated permanent adhesive layer (23). The vehicle substrate (24) is an automobile, ground vehicle, marine vessel, and aerospace body part.

Figure 3:
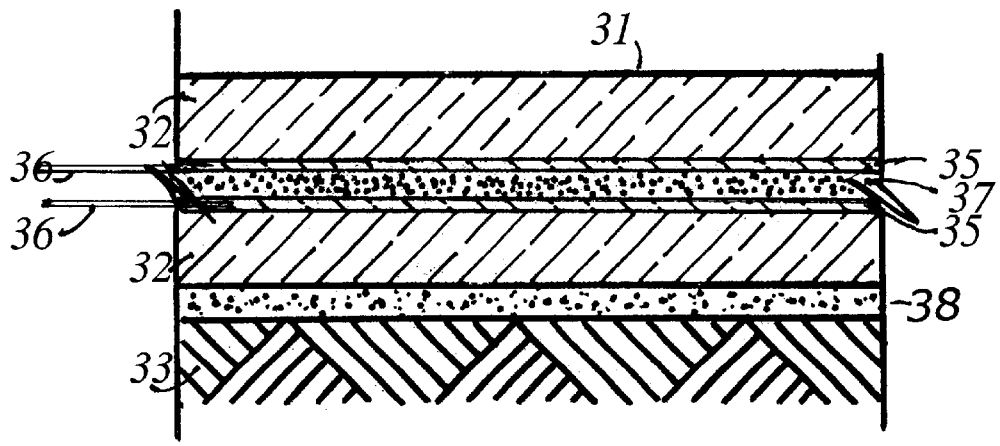
FIG. 3 is a vertical cross sectional view through a galvanic cell, in fragment, showing another embodiment of the conformable coating as a coating containing electro-chromic tonal and coloring material.

FIG. 3. shows a conformable coating (31) comprising:

a) a heat shrink polymeric substantially transparent matrix sheet (32) having first and second major surfaces;

b) wherein said polymeric matrix sheet (32) is embedded with and envelopes two layers of Ormecon™ Incofilm (35) with appropriate wiring means (36) separated by an electrolyte gel (37) within said polymer matrix sheet (32);

c) wherein the first surface of said of said polymeric matrix sheet (32) possesses a transfer coated permanent adhesive layer (38). The vehicle substrate (33) is an automobile, ground vehicle, marine vessel, and aerospace body part.

DESCRIPTION OF THE PREFERRED EMBODIMENT

The preferred embodiment of this invention is a conformable coating containing active tonal and coloring material selected from the classes of thermochromics: liquid crystals, leucodyes, and thermochromic inks.

The preferred embodiment of this invention is as a coating affixed to an aerospace body part as the vehicle substrate.

The composition of the coating comprises a polyurethane, a polyester, and a polyolefin matrix sheet which possesses a preferred layer thickness within the range of 1.0 to 2.0 mm. Some examples of the polyolefin include a homopolymer of -an olefin, such as ethylene, propylene, and butene, a copolymer of two or more -olefins, and a copolymer of two or more -olefins, and a copolymer of one or more -olefins with another monomer, such as vinyl acetate or methyl methacrylate. The preferred embodiment of the present invention is as a coating with the thermo-mechanically worked matrix sheet being comprised of an aliphatic polyurethane.

The polymeric matrix sheet is embedded with 1 to 10 percent by weight of both reversible and irreversible thermochromic material, with the preferred figure being 3.0 to 4.0 percent by weight. This thermochromic tonal and coloring material is selected from thermochromic liquid crystals, leucodyes, and thermochromic inks.

Thermochromic liquid crystals change color with temperature. They can be formulated to change temperature within the range from −30 to 120° C., and are reversible in that they can be used over and over again. Thermochromic liquid crystals start black below their temperature range, but when the temperature reaches the low end of the range they turn milky brown, then reddish, yellow, green, blue, violet, and then black again above the temperature range.

Leucodyes change from one color when cold, and then change to clear upon heating. It takes about 9° C. for a leucodye to change from a colored state to clear. They can be reversible or irreversible.

Chromatic Technologies DYNACOLOR™ thermochromic inks, the preferred tonal and coloring material, change from a particular color when cold, to a lighter color or colorless as they warm up across the activation temperature. One can control the temperature at which the inks change color. The inks' activation temperature can be varied from −5° C. to 55° C. DYNACOLOR™ thermochromic inks are available in three standard temperatures: "Low Temperature", at 15° C., "Body Temperature", at 31° C., and "High Temperature", at 45° C. The color change options include red to colorless, orange to colorless, orange to yellow, green to yellow, green to colorless, blue to colorless, purple to pink, purple to blue, purple to colorless, brown to yellow, brown to green, brown to blue, brown to colorless, gray to colorless, and black to colorless.

The polymeric matrix sheet is embedded with 0.5 to 1.0 percent by weight of an organic and inorganic pigment selected from quinacridone (Pig Red 122, Ferro Corp.), diarylide yellow (Pig Yell 127, Holland Colors Americas), phthalocyanine blue (Pig Blue 15, BASF Corp.), phthalocyanine green (Holland Colors Americas), carbon black (Pig Blk 7, Holland Colors Americas), titanium dioxide (Pig White 6, Holland Colors Americas), iron oxide (Pig Red 101, Holland Colors Americas), ultramarine blue (Pig Blue 29, BASF Corp.), chromium oxide (Pig Gr 17, Holland Colors Americas), and titanium pigments (Pig Gr 26 & Pig Gr 50, BASF & Holland Colors Americas).

The transfer coated adhesive layer superimposed on the first surface of the polymeric matrix sheet is selected from the following: 1—epoxy; 2—epoxy-alkyl ester; 3—epoxy bisphenol A-based; 4—furan resin; 5—melamine formaldehyde; 6—phenol formaldehyde; 7—phenol formaldehyde-resorcinol formaldehyde; 8—phenolic; 9—phenolic-epoxy resin; 10—polyester; 11—polyethylene imine; 12—polyisocyanate; 13—polyurethane; 14—resorcinol formaldehyde; 15—silicone resin; 16—urea formaldehyde; 17—urea formaldehyde-melamine formaldehyde. The preferred adhesive is an epoxy with a thickness of about 0.5 mils.

DESCRIPTION OF OTHER EMBODIMENTS

Another embodiment of this invention is as a conformable coating embedded with 1 to 10 percent by weight of reversible photochromic material, with the preferred figure being 3.0 to 4.0 percent by weight. This photochromic tonal and coloring material is selected from PPG's PhotoSol$^R$ photochromic dyes supplied as a crystalline organic dye. These commercial organic materials come in four base colors: blue, yellow, orange, and red. When combined, additional colors such as green, brown, and gray can be produced. By further adjusting the ratios of combinations of these photochromic dyes, various additional shades of green, blues, browns, and dark reds can be achieved.

Additionally by using a base UV transparent color, additional photochromic color effects can be produced e.g., base pink plus blue photochromic used in sunlight will produce a purple color.

A further embodiment of this invention is as a conformable coating embedded with electrochromic materials. This electrochromic tonal and coloring material changes color when its composition is changed by use of an electrochromic cell.

Such an electrochromic device that operates in the transmission mode consists of a galvanic cell with several different layers. All component layers are transparent in the uncolored state. The coloration of the electrochromic layer is achieved by passing current through the cell. The degree of coloration can be controlled by the amount of charge passed through the cell and the colored state remains after switching off the voltage. To bleach the device, one just needs to reverse the polarity of the voltage.

Polymers that conduct electric currents without the addition of conductive (inorganic) substances are known as "intrinsically conductive polymers". Polyaniline has been developed by Zipperling Kessler & Co. and is marketed under the trade name "Ormecon™". Polyaniline is an organic metal. Besides its metallic character polyaniline is a redox-active material. In the conductive state, it is green, and may change its color and its conductivity on exposure to voltage. It changes yellow under reducing conditions, and blue under oxidizing ones.

Incofilm is a polyester film coated with a thin conductive layer. The conductive coating consists of a dispersion of the intrinsically conductive polyaniline ORMECON.

Cathodically coloring polymers: poly(3,4-ethylenedioxythiophene, bis{trimethylsilyl[poly(3,4-ethylenedioxythiophene)]}, poly[{3,4-ethylenedioxythiophene}-$C_{14}H_{29}$], poly[{3,4-ethylenedioxythiophene}-$C_{16}H_{33}$], and anodically coloring polymers: poly[bis(3,4-ethylenedioxythiophene)-N-methylcarbazole], poly[bis(3,4-ethylenedioxythiophene)-N-$C_{20}H_{41}$carbazole], and poly[bis (3,4-ethylenedioxy-thiophene)biphenyl], developed by the Reynolds group at the University of Florida, are well suited for being utilized in the conformable coating.

This electrochromic device utilizes a highly conductive electrolyte gel sandwiched between the two layers of electrochromic polymers.

A facile means of retrofitting the conformable coating onto a vehicle substrate comprises the steps of:
a) applying said polymeric matrix sheet on its first surface to said vehicle substrate body part;
b) subjecting said polymeric matrix sheet to heat to shrink said sheet to conform to said vehicle substrate body part; and
c) effecting the activation and curing of said adhesive with heat to affix it permanently thereto.

The polymeric substantially nonopaque matrix sheet can be applied to vehicle body parts ranging in size from 2–3 square feet up to 1000 square feet. This procedure is ideally suited to the retrofitting of the vehicle in the field. A heat gun serves as the source of heat to shrink the sheet to conform to the vehicle substrate body part. The same heat source is then used to effect the activation and curing of the adhesive. The Tg of the polymeric matrix sheet is sufficiently lower than the heat activation temperature of the adhesive to allow for ease of attaching the polymeric matrix sheet onto the vehicle substrate body part before it is permanently affixed in place.

EXAMPLE 1

The Conformable Coating Containing Thermochromic Material

The vehicle substrate is a 1998 Ford Contour.

The composition of the conformable coating comprises a thermo-mechanically worked matrix sheet of polyethylene terephthalate which possesses a preferred layer thickness within the range of 0.25 to 2.0 mm. Polyethylene terephthalate is available as Rynite from Dupont.

The polyethylene terephthalate matrix sheet envelopes ten percent by weight of packets of thermochromic liquid crystal material (Color Change Corporation).

The polyethylene terephthalate matrix sheet is embedded with 0.5 to 1.0 percent by weight of constant metallic and nonmetallic pigments selected from aluminum flake, copper bronze flake, metal oxide coated mica, titanium dioxide, iron oxide, chromium oxide, and lead chromate.

The transfer coated adhesive layer superimposed on the first surface of the polyethylene terephthalate matrix sheet is an epoxy (EPON 58901, Shell Chemical Company), with a thickness of about 0.5 mils. This adhesive is utilized with a flexibilizer (HELOXY Modifier 84, Shell Chemical Company) and curing agent (EPI-CURE Curing Agent 9360, Shell Chemical Company).

Thus the Ford Contour will appear black below 32° F., but as the temperature rises the vehicle color will turn brown, then reddish, yellow, green, blue, violet, and then turn back to black again above 94° F.

EXAMPLE 2

The Conformable Coating Containing Thermochromic Material

The vehicle substrate is a white 1998 Lincoln Towncar.

The composition of the conformable coating comprises a thermo-mechanically worked matrix sheet of polyethylene terephthalate which possesses a preferred layer thickness within the range of 1.0 to 2.0 mm. Polyethylene terephthalate is available as Rynite from Dupont.

The polyethylene terephthalate matrix sheet envelopes ten percent by weight of DYNACOLOR™ thermochromic ink black to colorless at 31° C. (Chromatic Technologies Inc.).

The polyethylene terephthalate matrix sheet is embedded with 0.5 to 1.0 percent by weight of the constant pigment titanium dioxide (Pig White 6, Holland Colors Americas).

The transfer coated adhesive layer superimposed on the first surface of the polyethylene terephthalate matrix sheet is an epoxy (EPON 58901, Shell Chemical Company), with a thickness of about 0.5 mils. This adhesive is utilized with a flexibilizer (HELOXY Modifier 84, Shell Chemical Company) and curing agent (EPI-CURE Curing Agent 9360, Shell Chemical Company).

Thus the Lincoln Towncar will appear black below 31° C., but as the temperature rises above 31° C. the vehicle will appear white.

EXAMPLE 3

The Conformable Coating Containing Photochromic Material

The vehicle substrate is the Boeing B-52 Stratofortress.

The composition of the conformable coating comprises a thermo-mechanically worked matrix sheet of aliphatic polyurethane (TEXIN 5370, Bayer Corp.) which possesses a preferred layer thickness within the range of 1.0 to 2.0 mm.

The polyurethane matrix sheet is embedded with 3.0 to 4.0 percent by weight of Photosol$^R$ photochromic dyes (PPG Industries) selected from a combination of the four base colors: blue (Photosol$^R$ 0272), yellow (Photosol$^R$ 5-3), orange (Photosol$^R$ 5-68), and red (Photosol$^R$ 7-49). By adjusting the ratios of combinations of these photochromic dyes, the desired shades of blue and gray can be achieved.

The polyurethane matrix sheet is embedded with 3.0 to 4.0 percent by weight of a constant pigment. The constant organic pigment that is suitably used in this case is carbon black (Pig Blk 7, Holland Colors Americas).

The transfer coated adhesive layer superimposed on the first surface of the polyurethane matrix sheet is an epoxy (EPON 58005, Shell Chemical Company), with a thickness of about 0.5 mils. This adhesive is utilized with a flexibilizer (HELOXY Modifier 84, Shell Chemical Company) and curing agent (EPI-CURE Curing Agent 9360, Shell Chemical Company).

Thus the B-52 will appear its normal toned gray color in the dark, but in the daylight the plane will appear as a bluish and grayish hue to better blend into the sky.

EXAMPLE 4

The Conformable Coating Containing Photochromic Material

The vehicle substrate is the Lockheed SR-71 Blackbird reconnaissance aircraft.

The composition of the conformable coating comprises a thermo-mechanically worked matrix sheet of aliphatic polyurethane (TEXIN 5370, Bayer Corp.) which possesses a preferred layer thickness within the range of 1.0 to 2.0 mm.

The polyurethane matrix sheet is embedded with and envelopes 3.0 to 4.0 percent by weight of two layers of Ormecon™ Incofilm (Zipperling Kessler & Co.) with appropriate wiring means separated by StatSign$^R$ Saline Electrolyte Gel (Chester Labs).

The polyurethane matrix sheet is embedded with 3.0 to 4.0 percent by weight of a constant pigment. The constant organic pigments suitably used in this case are carbon black (Pig Blk 7, Holland Colors Americas), phthalocyanine blue (Pig Blue 15, BASF Corp.), and ultramarine blue (Pig Blue 29, BASF Corp.).

The transfer coated adhesive layer superimposed on the first surface of the polyurethane matrix sheet is an epoxy (EPON 58005, Shell Chemical Company), with a thickness of about 0.5 mils. This adhesive is utilized with a flexibilizer (HELOXY Modifier 84, Shell Chemical Company) and curing agent (EPI-CURE Curing Agent 9360, Shell Chemical Company).

Thus the Blackbird aircraft, possessing the capability of reproducible electrolytic switching between differently conducting states of the intrinsically conductive polymer, will appear its natural jet-black in the bleached state. However in the oxidized state the aircraft will appear blue.

What is claimed is:

1. A conformable coating for vehicle substrates comprising:
    a heat shrink polymeric substantially non-opaque matrix sheet fabricated from substantially transparent compositions of polyurethane, polyester, and polyolefin resins in a thickness within the range of 0.15 mm to 2.0 mm and thermo mechanically-worked to shrink when heated having first and second major surfaces; wherein said polymeric matrix sheet is embedded with and envelopes active and constant tonal and coloring material within said polymeric matrix sheet; wherein said first surface of said polymeric matrix sheet possesses a transfer coated permanent adhesive layer.

2. The conformable coating for vehicle substrates of claim 1, wherein said vehicle substrate is an automobile, ground vehicle, marine vehicle, or aerospace body part.

3. The conformable coating for vehicle substrates of claim 1, wherein said active tonal and coloring material is selected from the group consisting of thermochromic materials.

4. The conformable coating for vehicle substrates of claim 1, wherein said active tonal and coloring material is selected from the group consisting of photochromic materials.

5. The conformable coating for vehicle substrates of claim 1, wherein said active tonal and coloring material is selected from the group consisting of electrochromic materials.

6. The conformable coating for vehicle substrates of claim 1, wherein said constant tonal and coloring material is a metallic pigment selected from the group consisting of aluminum flake, copper bronze flake, and metal oxide coated mica.

7. The conformable coating for vehicle substrates of claim 1, wherein said constant tonal and coloring material is a nonmetallic pigment selected from the group consisting of titanium dioxide, iron oxide, chromium oxide, lead chromate, carbon black and organic pigments.

8. The conformable coating for vehicle substrates of claim 1, wherein said adhesive layer is a thermosetting adhesive.

9. A method of utilization of the conformable coating of claim 1 for the retrofitting permanent attachment onto a vehicle substrate comprising the steps of:

applying said polymeric matrix sheet on its first major surface to a vehicle substrate body part;

subjecting said polymeric matrix sheet to heat to shrink said sheet so as to conform to said vehicle substrate body part; and effecting the activation and curing of the adhesive layer with heat so as to affix it permanently to said vehicle substrate body part.

\* \* \* \* \*